Feb. 29, 1944. A. W. SPICER 2,342,979
APPARATUS FOR PREVENTING ACCRETION OF ICE
Filed Feb. 25, 1942
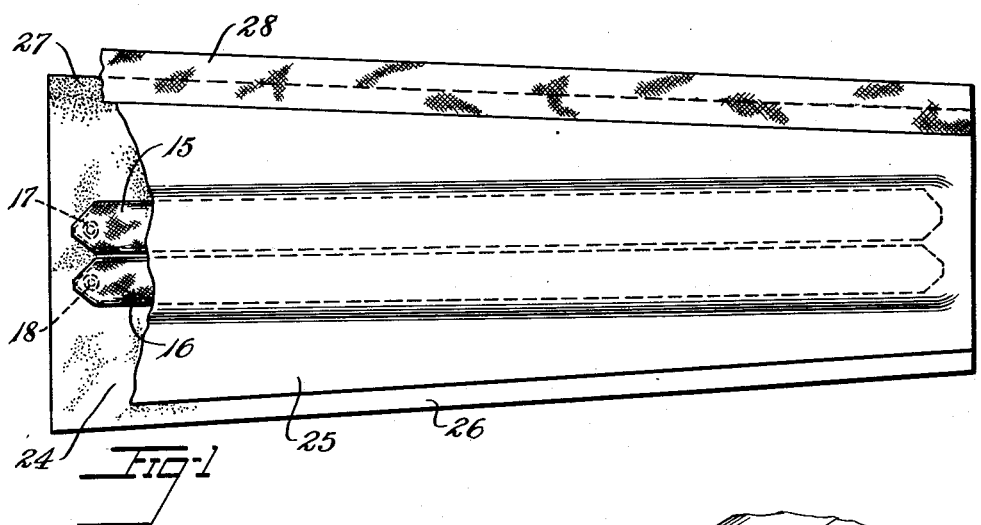
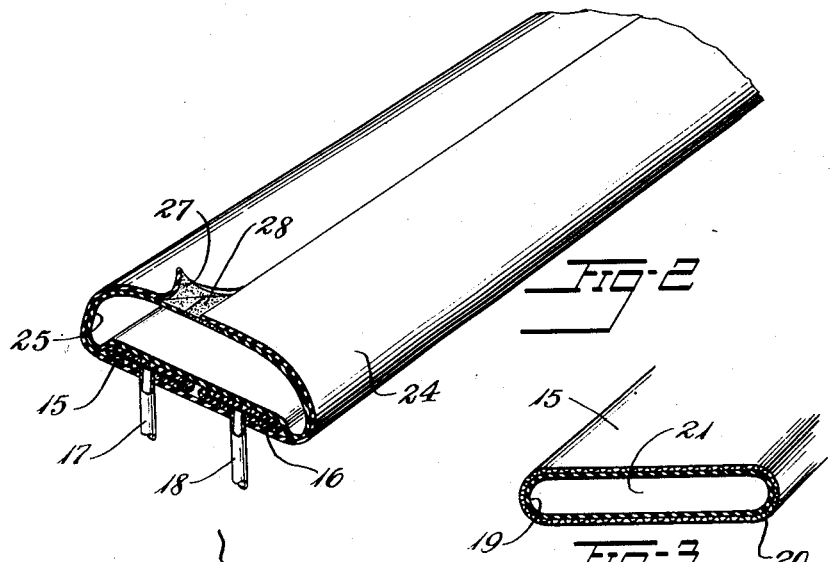
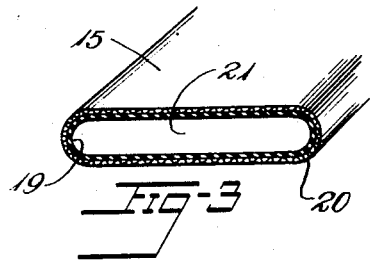
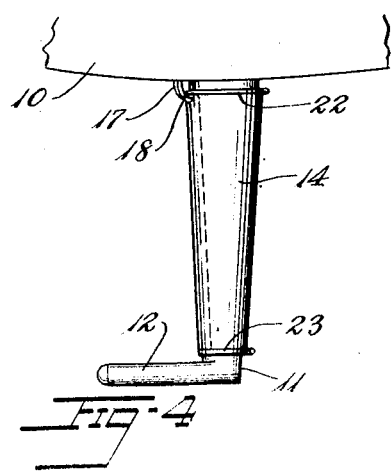

Patented Feb. 29, 1944

2,342,979

UNITED STATES PATENT OFFICE 2,342,979

APPARATUS FOR PREVENTING ACCRETION OF ICE

Alvin W. Spicer, Cuyahoga Falls, Ohio, assignor to The B. F. Goodrich Company, New York, N. Y., a corporation of New York Application February 25, 1942, Serial No. 432,231

2 Claims. (Cl. 244—134)

This invention relates to apparatus for preventing accretion of ice on the surfaces of aircraft and is especially useful in the removal of ice from slender mast-like projections such for example as Pitot tube masts, radio aerial masts and the like.

The principal objects of the invention are to provide a distensible ice removing mechanism adapted to be easily applied to and removed from the projecting member, to provide for light weight and neatness of construction, and to provide for convenience of manufacture and ease of attachment and removal.

A further object is to provide the mechanism in tubular form completely and permanently closed throughout its periphery together with elasticity of its wall to permit stretching the same for mounting it upon the projecting member.

These and other objects will appear from the following description and the accompanying drawing.

Of the drawing:

Fig. 1 is a plan view of apparatus constructed according to and embodying the invention before it is seamed in tubular form, parts being broken away.

Fig. 2 is a perspective view of the completed apparatus, shown partly broken away and partly in section.

Fig. 3 is a cross-sectional view of one of the inflating tubes.

Fig. 4 is a side view of apparatus constructed according to and embodying the invention as applied to a Pitot tube mast.

Referring to the drawing, the numeral 10 designates a portion of an aircraft, such as the fuselage, from which a small tapered mast-like body 11, such as a Pitot tube mast, subject to accretion of ice due to its projection into the air flow, extends. The Pitot tube has a forwardly projecting foot portion 12 extending substantially at right angles to the mast-like body. While the portion 12 is usually electrically heated to prevent accretion of ice at its measuring orifice, such heating of the entire mast-like body to the extent that accretion of ice may be entirely prevented has not been found practicable. It is therefore desirable to provide more effective ice removing means for such body, as accretion of ice causes unbalance, vibration and frictional drag, as well as addition of weight to the aircraft.

For preventing the accretion of ice on the mast-like body, a tapered elastic tubular sleeve 14 is provided about the surface of the body, and one or more inflatable tubes 15, 16 are incorporated in the elastic wall of the sleeve for changing its contour by inflation thereof for removing ice. Flexible connecting tubes 17, 18 communicate with the respective inflation tubes 15, 16 and extend from the sleeve to a suitable supply of air under pressure. The inflation tubes 15, 16, one of which is illustrated in Fig. 3 are preferably formed of elastic rubber-like material providing an impervious lining 19, and at least one layer 20 of reinforcing fabric, the fabric reinforcement acting to limit inflation of the tube. The ends of the inflation tube are sealed so that the connecting tubes 17 or 18 provide the sole passage to the cavity 21 of the tube for inflation or deflation of the tube.

To provide an elastic structure adapted for ready placement on or removal from the Pitot tube mast or other projection of the aircraft, the inflation tubes 15, 16 are adhesively secured to the elastic tubular sleeve 14 by being adhered or vulcanized to its inner surface along one side of the tubes and over a relatively small circumferential extent of the sleeve, the air tubes 17, 18 extending through the wall of the sleeve. The sleeve 14 is constructed of extensible rubber-like material, such as soft vulcanized rubber or synthetic rubber-like material, having a high degree of stretchability throughout a substantial portion of its circumference so as to permit its placement or removal from the part to be protected by being slipped thereover endwise, the sleeve being readily bent or stretched to pass over bends of the object to be covered and, due to its elasticity, returning quickly to close conformance with the surface on which it is placed. The elastic wall of the sleeve also permits distortion of the covering by stretch when the tubes 15, 16 are inflated to loosen ice formations. Preferably the outer surface of the sleeve is constructed of material having low adhesion to ice, and for minimizing the effects of static electricity the rubber-like material may contain graphite or other conductive material in its composition so that the charges of electricity will be conducted away to metallic parts of the aircraft.

For preventing undesirable longitudinal stretch of the sleeve at the side of the sleeve opposite the inflation tubes, and to facilitate manufacture of the article in flat form, a narrow strip 28 of square-woven rubberized fabric may be included in the wall of the sleeve. As the inflation tubes are narrow, these and the reinforcing strip occupy a relatively small portion of the circumference so that a substantial portion of the wall of the sleeve circumferentially thereof is highly elastic and permits placement over and removal from a bent portion of the aircraft without the necessity of separable seams or openings or fastening means.

Where more than one inflation tube is employed, the tubes may be inflated and deflated alternately to stretch the sleeve and crack the ice accretion therefrom so that it is blown away by force of the air flow, although if desired they may be inflated and deflated simultaneously.

The sleeve 14 may be held in place by the assistance of metallic clamping bands 22, 23 placed about its extremities, or by wire bindings or similar means, although the elasticity of the sleeve contributes largely to this end.

The protective covering may be constructed by first forming the inflatable tubes 15, 16 and then cementing one side thereof over a sheet 24 of rubber-like material to provide the outer surface of the sleeve, the sheet being cut to the desired length and width to closely surround the part of the aircraft to be protected. Apertures are provided in the sheet 24 for passage of the connecting tubes 17, 18. A second sheet 25 of elastic rubber-like material of equal length and somewhat narrower than sheet 24 is then cemented over the tubes 15, 16 to provide the inner surface or lining and is adhered to the layer 24. Where the object, such as the Pitot tube mast, is tapered, the layers 24, 25 are cut narrower at one end than at the other to fit closely. The sheet 25 is laid intermediate the long margins 26, 27 of sheet 24 so as to leave those margins projecting. A strip 28 of square-woven rubberized fabric is cemented over one of the exposed margins 27 with one of its edges abutting a long margin of the sheet 25 and with its opposite margin projecting beyond the margin 27 of sheet 24 by a distance equal to the width of the exposed margin 26. The substantially flat article is then vulcanized in flat form. The article is then folded or rolled to tubular form and the margin 26 is adhered, preferably by a vulcanizable cement, to the exposed margin of the strip 28 abutting against margin 27. In this position heat and pressure are applied along the seam to vulcanize the margins together and to provide a permanent union.

As the strip 28 and the tubes 15, 16, which are of limited circumferential extent, are the only parts containing fabric, a substantial part of the circumference of the sleeve 14 is of elastic vulcanized rubber-like material which may be readily distorted or stretched to permit placing of the sleeve over a Pitot tube mast or other aircraft part having a bent portion such as the foot 12. The sleeve may be slipped into position over the foot like a glove or stocking to its place on the mast and the elastic wall of the sleeve conforms closely to the mast.

The bands 22, 23 assist in holding the ends of the sleeve in place and permit distortion of the sleeve therebetween by change of its contour due to inflation for ice removal. While the connecting tubes 17, 18 have been shown for independent inflation and deflation of the inflation tubes 15, 16, these may be connected together or manifolded for simultaneous inflation and deflation of tubes.

Variations may be made without departing from the scope of the invention as it is defined by the following claims.

I claim:

1. Apparatus for preventing accretion of ice on a member projecting from aircraft, said apparatus comprising a tubular sleeve for said member, and inflatable means associated with said sleeve and adapted to change the contour of the sleeve when said sleeve is assembled on said member for discharging an ice formation therefrom, said tubular sleeve being completely and permanently closed throughout its circumference and of readily stretchable rubber-like material throughout a substantial part of its circumference to permit its being stretched in the tubular form over said member and having a single longitudinal vulcanized seam, and a strip of reinforcing material permanently united with the sleeve across and along said seam.

2. Apparatus for preventing accretion of ice on a tapered mast member projecting from aircraft, said apparatus comprising an open-ended tapered tubular sleeve adapted to embrace the tapered mast of said member, and a plurality of inflatable tubes associated with a wall of said sleeve and extending longitudinally thereof at a forward part of its circumference for changing the contour of the sleeve when said sleeve is assembled on said member to discharge an ice formation thereon, said tubes being arranged symmetrically with respect to the sleeve to provide symmetrical change of contour, said sleeve having a longitudinal seam diametrically opposite said tubes and a reinforcing strip permanently united to said sleeve along and across said seam to resist longitudinal stretching of the sleeve and circumferential creep thereof with respect to the mast, said sleeve being completely and permanently closed throughout its circumference and of readily stretchable rubber-like material throughout a substantial part of its circumference at its sides in the areas between said tubes and said strip to permit its being stretched in tubular form over said tapered mast member, and clamping bands at the ends of the sleeve for securing the sleeve to the mast.

ALVIN W. SPICER.